May 23, 1933. T. O. MACKEY ET AL 1,909,975
MOUNTING FOR HARD CUTTING MATERIAL
Filed Nov. 3, 1930
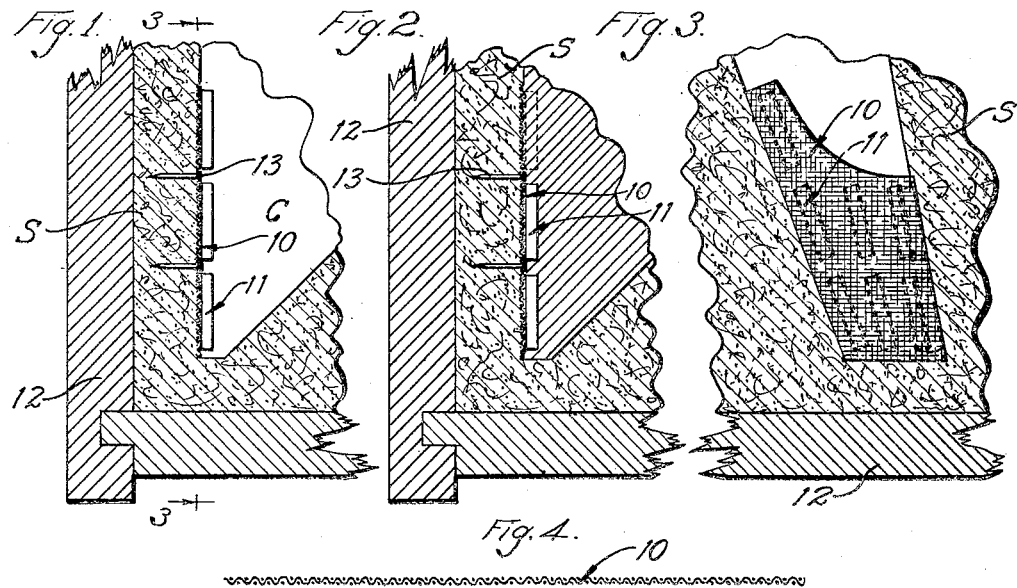
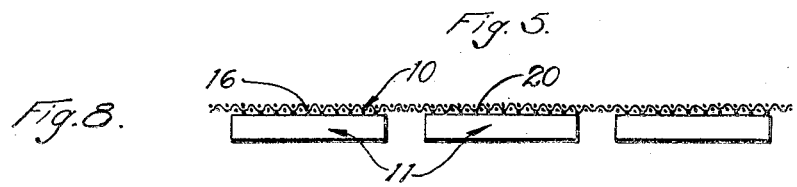
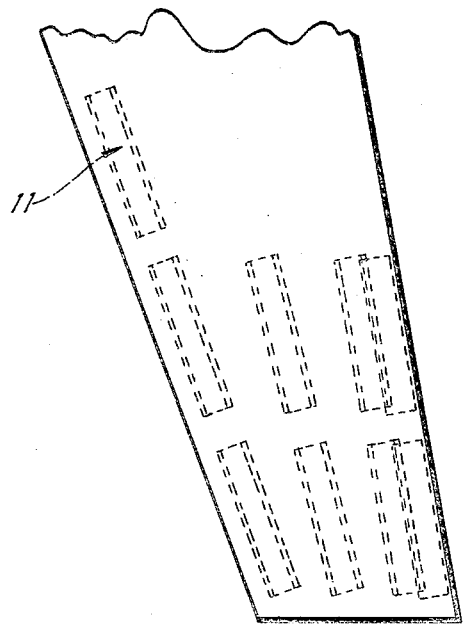
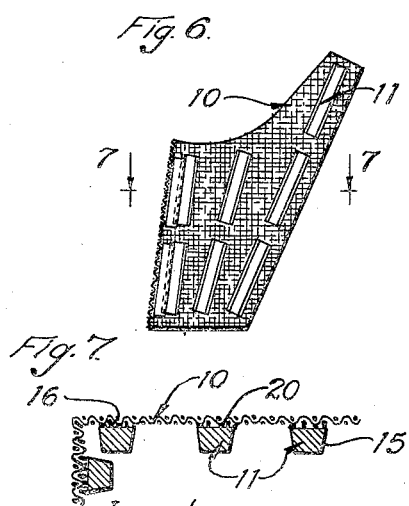
Inventors
Thomas O. Mackey.
John H. Howard.
By
Their Attorney Patented May 23, 1933

1,909,975

UNITED STATES PATENT OFFICE

THOMAS O. MACKEY, OF WHITTIER, AND JOHN H. HOWARD, OF HUNTINGTON PARK, CALIFORNIA, ASSIGNORS TO GLOBE OIL TOOLS COMPANY, OF LOS NIETOS, CALIFORNIA, A CORPORATION OF CALIFORNIA

MOUNTING FOR HARD CUTTING MATERIAL

Application filed November 3, 1930. Serial No. 493,072.

This invention relates to a mounting for hard cutting material and relates more particularly to a cutter assembly and a mounting for applying, or embodying "cutting diamonds" or small particles of hard cutting material in the body of the cutter.

Various forms of cutting devices and cutters are provided with "cutting diamonds" or small bodies of hard cutting material such as tungsten carbides, etc. Bodies of hard cutting material of the character referred to are often embedded or partially embedded in the cutting edges and faces of the cutting tools. It has been the general practice to weld the diamonds or particles of hard cutting material onto or into the cutting parts of the tools. This method of applying the hard cutting material to a tool requires considerable welding which is more or less injurious to the hard cutting material and makes the cutting tools very irregular.

It is a general object of the present invention to provide a simple practical, and improved means for mounting or embodying a plurality of bodies of hard cutting material in a cutting tool.

Another object of the invention is to provide a means for mounting or embodying a plurality of bodies of hard cutting material in a tool in any particular arrangement or spacing on the cutting parts of the tool.

It is another object of the invention to provide an improved mounting structure for supporting a plurality of bodies of hard cutting material in a mold cavity to effectively retain the bodies in their proper positions during the pouring or casting of the tool, so that they are in the desired positions in the finished product.

Another object of the invention is to provide a mounting for supporting bodies of hard cutting material in a mold that melts and mingles with the molten metal when the mold is being poured and which will not buckle or warp during the casting of the tool so that the bodies of hard cutting material are retained in their proper positions.

It is another object of the invention to provide a mounting for a hard cutting material that may be readily bent and shaped to conform to the contour of a mold cavity so that a single mounting may be employed for supporting a plurality of bodies of cutting material on two or more faces of a mold.

A further object of the invention is to provide a mounting for supporting cutting diamonds or bodies of cutting material in a mold that includes a carrier of screening to which the diamonds are attached.

Other objects and features of the invention will be best and more fully understood from the following detailed description of a typical form and application of the invention, throughout which description reference is had to the accompanying drawing, in which:

Fig. 1 is a vertical detailed sectional view through a typical mold illustrating the assembly provided by the present invention arranged in the mold cavity. Fig. 2 is a view similar to Fig. 1 showing the mold cavity filled with the metal forming the tool. Fig. 3 is a vertical detailed sectional view taken as indicated by line 3—3 on Fig. 1. Fig. 4 is a longitudinal sectional view of a piece of screening from which the carrier embodied in the present invention may be formed. Fig. 5 is a view of the carrier and the bodies of hard cutting material attached to the carrier. Fig. 6 is a reduced side elevation of the inner side of the assembly of the carrier and the bodies of hard cutting material. Fig. 7 is an enlarged transverse detailed sectional view taken as indicated by line 7—7 on Fig. 6, and Fig. 8 is an enlarged side elevation of the finished or completed cutter assembly.

The present invention is intended primarily for use in connection with the formation of various types of cutting tools where it is desired to mount or embody inserts or pieces of hard cutting material in the cutting parts of the tools. Throughout the following detailed description the invention will be considered as employed for embodying or mounting cutting diamonds or bodies of hard cutting material in the cutting parts of a cutter of a well bit or drill. It is to be understood that the invention is not to be taken as restricted to the particular form or application about to be described, but that it is to be taken as including any features or modifications that may fall within the scope of the claims.

The assembly provided by the present invention includes, generally, a mounting structure or carrier 10 adapted to be arranged in the matrix or cavity of a mold, and one or more bodies 11 of hard cutting material attached to the carrier 10.

The carrier 10 is provided to carry the diamonds or bodies 11 and to support them in a mold cavity prior to and during the pouring of the mold to form the tool. It is a feature of the invention that the carrier 10 is adapted to be shaped for mounting in mold cavities of various sizes, shapes, and characters, and that it is adapted to be formed so as to support the bodies 11 on one or more walls of a mold cavity. In the drawing we have illustrated a typical mold 12 carrying sand S in which a cavity C has been formed to receive the molten metal to form the tool. The carrier 10 is such that it may be shaped to fit against any portion or portions of the walls of the cavity C. In accordance with the invention the carrier 10 is formed of screening and may be easily bent or distorted to fit against the walls of the mold cavity. It is preferred to form the carrier 10 of iron, wire screening, or of screening of a suitable metal having a low melting point so that it is melted to mix or mingle with the molten metal when the tool is cast. The screening of which the carrier 10 is formed may be of between four and eight mesh. In the preferred form of the invention the carrier 10 is formed of a single or integral piece of screening. The carrier formed of soft metal wire is easily bent and shaped so as to be arranged against one or more walls or sides of the cavity C.

It will be apparent how the carrier 10 may be easily bent or shaped to conform to the configuration of the walls of the cavity C on which it is to be mounted without causing it to warp or buckle. In the particular case illustrated the carrier 10 is shown arranged against the lower portion of one side of the cavity C and the lower portion of one end or edge of the cavity. The cavity C is shown as having substantially flat walls and the side and the end of the cavity on which the carrier 10 is arranged are at substantially right angles to one another. It will be readily apparent how the carrier 10 may be easily shaped to fit against irregular or curved walls of a mold cavity. The carrier 10 may be retained in position against the walls of the cavity C in any suitable manner. In the particular case illustrated short wires or nails 13 are arranged through the carrier 10 to extend into the sand S to support the carrier against the walls of the cavity.

The diamonds or bodies 11 are formed of a suitable hard cutting material, for example, they may be formed of a tungsten carbide, or the like. The cutting bodies 11 are provided in the tool to give the cutting parts or surfaces of the tool the desired abrasion and wear resisting qualities. In the particular case illustrated in the drawing the bodies 11 are mounted on the inner side of the carrier 10 so that they are embedded or encased in the metal forming the tool when the tool is cast. In accordance with the broader principles of the invention the bodies 11 of cutting material may be of any suitable shape and size and any desired number of bodies 11 may be employed in the assembly. The bodies 11 of hard cutting material illustrated in the drawing are elongated members having beveled sides or edges 15. The bodies 11 may be arranged or grouped as desired on the carrier 10. For example, they may be arranged in inclined rows as illustrated throughout the drawing. In accordance with the preferred form of the invention the bodies 11 are mounted directly against the inner side or sides of the carrier 10, and the outer sides 16 of the bodies are flat to effectively seat against the screening of the carrier 10. The edges or sides 15 of the bodies 11 are beveled to diverge slightly outward toward their outer sides. When the bodies 11 are formed in this manner the molten metal is free to flow around the sides 15 of the bodies to the carrier 10 when the tool is cast, so that it engages a maximum surface on each body.

In accordance with the invention the cutting diamonds or cutting bodies 11 are secured to the carrier 10 before it is mounted in the cavity C. In the preferred form of the invention the bodies 11 of hard cutting material are welded to the carrier. It has been found practical to weld the bodies 11 to the carrier 10 by the electrical method, that is, by passing an electrical current through the bodies 11 and carrier 10 so that the wire forming the carrier is fused to the outer sides 16 of the bodies 11. The bodies 11 may be formed sufficiently large so that a plurality of bent portions of the wire forming the screening 10 will engage the outer sides 16 of the bodies and will be fused to the bodies 11 when they are welded to the carrier. It will be apparent how the curved wire portions of the carrier 10 will be fused to the outer sides 16 of the bodies 11 as at 20 in Fig. 7 of the drawing when the bodies are welded to the carrier. By welding the cutting bodies 11 to the carrier 10 in the manner outlined above, the bodies 11 are effectively welded and secured to the carrier without causing the carrier to be buckled, distorted, or warped in any manner.

It is believed that the utility of the mounting for bodies of cutting material will be readily apparent from the foregoing detailed description. In employing the device the carrier 10 is arranged in the mold cavity C so that the bodies 11 of cutting material will be in the desired positions when the tool is cast. When the molten metal to form the tool is poured into the cavity C, it flows around the bodies 11 and may melt the screening of which the carrier 10 is formed so that it mingles with the metal forming the tool. In some instances, the screening of the carrier may not be entirely melted when the tool is cast due to the chilling effect of the bodies 11 and the walls of the mold cavity, etc. The carrier 10 is effective in supporting the bodies 11 during pouring of the mold so that they are in their proper positions when the tool is cast or completed.

It is to be noted that the present invention provides a simple and practical means for mounting cutting diamonds or bodies of cutting material in a mold. The carrier 10, being formed of screening, may be readily shaped to seat against the walls of a cavity of any configuration. The carrier 10 is not in any way distorted or warped when the bodies 11 are welded on its inner side, so that the bodies 11 are supported by the carrier 10 in their proper positions. The carrier 10 is particularly inexpensive of manufacture and is readily handled and arranged in a mold.

Having described only a typical preferred form of the invention, we do not wish to limit ourselves to the specific details set forth, but wish to reserve to ourselves any changes or variations that may appear to those skilled in the art or fall within the scope of the following claim.

Having described our invention, we claim

An insert for a mold including a carrier of screening adapted to lie flat against a wall of the mold cavity, and a polygonal body of hard cutting material on the inner side of the carrier having a side rigidly attached to the inner side of the carrier and having its other sides entirely free and exposed.

In witness that we claim the foregoing we have hereunto subscribed our names this 27th day of October 1930.

THOMAS O. MACKEY.
JOHN H. HOWARD.